United States Patent
Li et al.

(10) Patent No.: US 11,790,504 B2
(45) Date of Patent: Oct. 17, 2023

(54) MONITORING METHOD AND APPARATUS

(71) Applicant: Huawei Technologies Co., Ltd., Shenzhen (CN)

(72) Inventors: Ruihua Li, Shenzhen (CN); Hongqi Hu, Hangzhou (CN); Changcai Lai, Hangzhou (CN); Qingping Wang, Shenzhen (CN); Xiaolei Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 428 days.

(21) Appl. No.: 17/168,781

(22) Filed: Feb. 5, 2021

(65) Prior Publication Data

US 2021/0183041 A1   Jun. 17, 2021

Related U.S. Application Data

(63) Continuation of application No. PCT/CN2019/099275, filed on Aug. 5, 2019.

(30) Foreign Application Priority Data

Aug. 7, 2018  (CN) .......................... 201810891567.0

(51) Int. Cl.
    *G08G 1/04*      (2006.01)
    *G06T 7/00*      (2017.01)
    *H04N 7/18*      (2006.01)
    *G06V 20/54*     (2022.01)
    *H04N 23/951*    (2023.01)

(52) U.S. Cl.
    CPC ............ *G06T 7/0002* (2013.01); *G06V 20/54* (2022.01); *G08G 1/04* (2013.01); *H04N 7/181* (2013.01); *H04N 23/951* (2023.01); *G06T 2207/30168* (2013.01); *G06T 2207/30232* (2013.01); *G06T 2207/30236* (2013.01)

(58) Field of Classification Search
    CPC ........ G06T 7/0002; G06T 2207/30168; G06T 2207/30232; G06T 2207/30236; G06V 20/54; G06V 20/52; G08G 1/04; H04N 7/181; H04N 23/951; H04N 23/60; H04N 23/69; H04N 23/90
    USPC ...................................................... 382/103
    See application file for complete search history.

(56) References Cited

U.S. PATENT DOCUMENTS 4,366,501 A    12/1982  Tsunekawa et al.
6,408,140 B1    6/2002  Malloy Desormeaux
(Continued)

FOREIGN PATENT DOCUMENTS

CN    102104768 A    6/2011
CN    102164269 A    8/2011
(Continued)

*Primary Examiner* — Stephen P Coleman
(74) *Attorney, Agent, or Firm* — Conley Rose, P.C.

(57) ABSTRACT

A monitoring and photographing module includes one primary camera and N secondary cameras. The primary camera and the N secondary cameras are configured to collect images, and a frame rate at which any secondary camera collects an image is less than a frame rate at which the primary camera collects an image. Regions monitored by the N secondary cameras respectively cover N different regions in a region monitored by the primary camera, and a focal length of any secondary camera is greater than a focal length of the primary camera.

20 Claims, 9 Drawing Sheets

(56) References Cited

U.S. PATENT DOCUMENTS

| | | |
|---|---|---|
| 9,786,064 B2 | 10/2017 | Um et al. |
| 2015/0116502 A1 | 4/2015 | Um et al. |
| 2015/0358542 A1 | 12/2015 | Sato |
| 2016/0007008 A1 | 1/2016 | Molgaard et al. |
| 2016/0155472 A1* | 6/2016 | Elg .................. H04N 5/144 386/223 |
| 2016/0309133 A1 | 10/2016 | Laroia et al. |
| 2016/0337460 A1 | 11/2016 | Bao et al. |
| 2018/0070009 A1 | 3/2018 | Baek et al. |

FOREIGN PATENT DOCUMENTS

| | | |
|---|---|---|
| CN | 202939756 U | 5/2013 |
| CN | 104597825 A | 5/2015 |
| CN | 104780315 A | 7/2015 |
| CN | 105430285 A | 3/2016 |
| CN | 105930822 A | 9/2016 |
| CN | 106161961 A | 11/2016 |
| CN | 107800959 A | 3/2018 |
| CN | 108111818 A | 6/2018 |
| CN | 108184059 A | 6/2018 |
| EP | 0041391 A1 | 12/1981 |
| WO | 2008112053 A2 | 9/2008 |
| WO | 2014076920 A1 | 5/2014 |

* cited by examiner

MONITORING METHOD AND APPARATUS

CROSS-REFERENCE TO RELATED APPLICATIONS

This application is a continuation of International Patent Application No. PCT/CN2019/099275 filed on Aug. 5, 2019, which claims priority to Chinese Patent Application No. 201810891567.0 filed on Aug. 7, 2018, both of which are hereby incorporated by reference in their entireties.

TECHNICAL FIELD

This application relates to the field of video technologies, and in particular, to a monitoring method and apparatus.

BACKGROUND

Monitoring and photographing functions are important application of a current video surveillance system. An Internet Protocol camera (IPC) device is used to image vehicles and persons in a field of view, detect a target (which may include any object that needs to be monitored, such as a motor vehicle, a non-motor vehicle, or a pedestrian) of interest that enters the field of view, record a moving track of each target in the field of view, take a snapshot for the target in a period of time from a moment at which the target enters a monitored region to a moment at which the target leaves the monitored region, and display the snapshot on a video image.

Based on different application objectives, monitoring and capture systems can be classified into a facial capture system, a vehicle capture system, and a motor vehicle, non-motor vehicle, and pedestrian capture system. The facial capture system, also referred to as a facial checkpoint, is mainly installed on a sidewalk, a pedestrian crosswalk, or an indoor passage, mainly detects and captures faces and bodies of pedestrians, outputs facial snapshots and body snapshots, and is used for intelligent application such as facial recognition and body attribute recognition. The vehicle capture system mainly detects and captures motor vehicles, records vehicle snapshots, and is used for intelligent application such as vehicle attribute recognition, for example, license plate recognition and vehicle type/model/color recognition. Currently, both a common electronic police and a checkpoint capture system are vehicle capture systems. The electronic police is mainly installed at an intersection of urban roads to detect traffic violations, such as running a red light, driving over solid lines, driving against the direction of traffic, making an illegal lane change, occupying a non-motor vehicle lane, and ignoring lane markings. Checkpoints are commonly used on highways, national highways, and urban arterial roads to capture speeding behavior. The motor vehicle, non-motor vehicle, and pedestrian capture system detects, classifies, and tracks motor vehicles, non-motor vehicles, and pedestrians in scenarios in which motor vehicles, non-motor vehicles, and pedestrians coexist, and outputs snapshots of various targets. The motor vehicle, non-motor vehicle, and pedestrian capture system is mainly installed in a key public security region such as at an intersection or in an urban village, and is used to perform public security monitoring to implement comprehensive control over various targets.

An existing IPC capture system evolves from a video recording system. A device needs to implement both a video recording function and a target capture function. A snapshot is obtained by matting or cropping a frame of image in a recorded video. In other words, the snapshot and a video stream are from a same set of imaging components including a lens, an image sensor, and the like. All imaging parameters of the snapshot are consistent with those of a corresponding frame of image in the video stream. The imaging parameters include exposure duration, a contrast, and the like.

FIG. 1 shows a technical solution in other approaches. In FIG. 1, a front-end video collection module collects image data at a fixed frame rate (for example, 30 frames per second (fps)), performs face detection, tracking, and screening for the collected image data, and obtains an optimal face snapshot through matting from a specific frame of image data. In addition, the collected image data is video-compressed into a compressed video stream. The snapshot and the video stream are transmitted to a backend via a network or the like and are separately stored. In addition, processing such as feature extraction, target recognition, and search is performed on the snapshot.

It can be learned from the processing process in the foregoing solution that, an imaging parameter of the snapshot is consistent with an imaging parameter of the video stream, resulting in a low imaging resolution of a snapshot of a target region of interest. Under a non-ideal imaging condition, for example, in a complex lighting environment such as low luminance, a long distance of a target, or backlight/a wide dynamic range, imaging quality of a target region of interest is poor, affecting performance indicators of subsequent intelligent processing (such as facial recognition, license plate recognition, and vehicle type/model recognition). Specific impact includes the following.

(1) Poor quality of imaging in low luminance mainly includes a blurred image, a dark image, and loud noise. Some faces can be captured but cannot be used for a recognition algorithm. Visible light compensation causes great interference to pedestrians.

(2) A face image is blurred in a far field of view region, and a face region is small. Consequently, facial recognition cannot be performed.

(3) In a wide-dynamic-range scenario, in the full field of view, imaging quality is different, and a capability of resisting environmental interference is poor.

SUMMARY

Embodiments of this application provide a monitoring method and apparatus, to resolve problems such as blurring of a snapshot, low image luminance, loud noise, and a small size of a snapshot target in a monitoring application scenario such as low luminance, a long distance of a target, or backlight/a wide dynamic range, and increase performance indicators for subsequent intelligent processing (such as facial recognition, license plate recognition, and vehicle type/model recognition) performed on a snapshot.

Specific technical solutions provided in the embodiments of this application are as follows.

According to a first aspect, an embodiment of this application provides a monitoring and photographing module. The module includes one primary camera and N secondary cameras, where N is an integer greater than 1. The primary camera and the N secondary cameras are configured to collect images, and a frame rate at which any secondary camera collects an image is less than a frame rate at which the primary camera collects an image. Regions monitored by the N secondary cameras respectively cover N different regions in a region monitored by the primary camera, and a focal length of any secondary camera is greater than a focal length of the primary camera.

According to the first aspect, in a possible design, a field of view of the primary camera is greater than 60 degrees (°), the focal length of the primary camera falls between 4 millimeters (mm) and 8 mm, and an aperture value of the primary camera falls between 1.4 and 2.0. Because the field of view is greater than 60°, a sufficient monitoring field of view is ensured. The focal length and an aperture are configured to ensure, to the greatest extent, that when the focal length of the primary camera is used to collect video data, a short-distance central region or core region can be focused on, and a clear image can be formed.

According to the first aspect, in a possible design, a focal length of at least one secondary camera falls between 8 mm and 15 mm. Configuring "a medium/short-focus secondary camera" to collect an image can supplement a capability of monitoring a middle region in the region monitored by the primary camera.

According to the first aspect, in a possible design, a focal length of at least one secondary camera falls between 15 mm and 25 mm. Configuring "a long-focus secondary camera" to collect an image can supplement a capability of monitoring a remote region in the region monitored by the primary camera.

According to the first aspect, in a possible design, focal lengths of three secondary cameras fall between 12 mm and 18 mm, and focal lengths of the other four secondary cameras fall between 21 mm and 25 mm.

According to the first aspect, in a possible design, an aperture value of the primary camera falls between 1.4 and 2.0, an aperture value of at least one secondary camera falls between 0.8 and 1.6, and an aperture value of at least one secondary camera is less than the aperture value of the primary camera. In some scenarios, when there is insufficient light in the distance, a wide-aperture secondary camera can be used to increase a light admitted amount for image collection, so that a remote camera can form a clearer image. In this way, image quality of a snapshot is improved, and target recognition is facilitated.

According to the first aspect, in a possible design, N=4, and focal lengths of the four secondary cameras fall between 18 mm and 21 mm. This design is a possible module design, and can ensure that a clear image can be collected in a monitored region within 25 meters (m). Compared with monitoring with only a primary camera (which usually performs monitoring within 10 m), this design expands a range of high-quality monitoring.

According to the first aspect, in a possible design, N=7, focal lengths of three secondary cameras fall between 12 mm and 18 mm, and focal lengths of the other four secondary cameras fall between 21 mm and 25 mm. This design is a possible module design, and can ensure that a clear image can be collected in a monitored region within 35 m. Compared with monitoring with only a primary camera (which usually performs monitoring within 10 m), this design greatly expands a range of high-quality monitoring. The plurality of secondary cameras may use a plurality of focal lengths. Fields of view of different focal lengths are combined to ensure that the field of view monitored by the primary camera is covered. The plurality of secondary cameras use a field of view edge overlapping design for adjacent cameras to ensure that an area of an overlapping region can cover an entire target.

In addition, video data is collected by using the primary camera, and snapshots are collected by using the plurality of secondary cameras at a comparatively low frame rate, that is, in a manner similar to photographing. Compared with a manner in which all cameras are used to collect video data, this manner greatly reduces power consumption.

According to a second aspect, an embodiment of this application provides a monitoring method. The method is applied to a monitoring and photographing module. The monitoring and photographing module includes one primary camera and N secondary cameras, regions monitored by the N secondary cameras respectively cover N different regions in a region monitored by the primary camera, a focal length of any secondary camera is greater than a focal length of the primary camera, and N is an integer greater than 1. The method includes collecting images by using the primary camera and the N secondary cameras, where a frame rate at which any secondary camera collects an image is less than a frame rate at which the primary camera collects an image, selecting, from the images collected by the primary camera and the N secondary cameras, M images including a target object, where M is an integer greater than 1, cropping the M images based on the target object to obtain M small images including the target object, evaluating quality of the M small images, and displaying at least a small image with a best quality evaluation result among the M small images.

According to a third aspect, an embodiment of this application provides a monitoring apparatus. The apparatus is applied to a monitoring and photographing module. The monitoring and photographing module includes one primary camera and N secondary cameras, regions monitored by the N secondary cameras respectively cover N different regions in a region monitored by the primary camera, a focal length of any secondary camera is greater than a focal length of the primary camera, and N is an integer greater than 1. The apparatus includes a collection module, configured to collect images by using the primary camera and the N secondary cameras, where a frame rate at which any secondary camera collects an image is less than a frame rate (which is usually not less than 25 fps) at which the primary camera collects an image, a selection module, configured to select, from the images collected by the primary camera and the N secondary cameras, M images including a target object, where M is an integer greater than 1, a cropping module, configured to crop the M images based on the target object to obtain M small images including the target object, an evaluation module, configured to evaluate quality of the M small images, and a display module, configured to display at least a small image with a best quality evaluation result among the M small images.

According to the second aspect or the third aspect, in a possible design, resolutions of the primary camera and the secondary camera are not less than 2 megapixels.

According to the second aspect or the third aspect, in a possible design, both the primary camera and the secondary camera include a prime lens. Alternatively, the primary camera includes a zoom lens, and the secondary camera includes a prime lens.

According to the second aspect or the third aspect, in a possible design, a parameter of the secondary camera is set to ensure that pixels of a face image collected within a long monitoring distance (for example, 20 m) are more than 50×50 pixels, to achieve a 4K snapshot.

According to the second aspect or the third aspect, in a possible design, for a distant target, an actual image shot by the primary camera is smaller, but an actual image shot by the secondary camera is larger because the secondary camera uses a "long-focus lens". Because sizes of the actually collected images of the same target are different, a mapping relationship between the images collected by the two cameras needs to be determined, that is, a correspondence between positions in the images. The mapping relationship may be determined through calibration.

According to the second aspect or the third aspect, in a possible design, for the images collected by the primary camera and the secondary cameras, image processing operations such as demosaicing, auto exposure (AE), auto white balance (AWB), and auto focus (AF) (3A), denoising, and red-green-blue (RGB)-to-luma-chrominance-chroma (YUV) conversion may be performed on RGB data, to obtain YUV image data.

According to the second aspect or the third aspect, in a possible design, the focal length of the primary camera falls between 4 mm and 8 mm, N=4, and focal lengths of the four secondary cameras fall between 18 mm and 21 mm. This design is a possible module design, and can ensure that a clear image can be collected in a monitored region within 25 m. Compared with monitoring with only a primary camera (which usually performs monitoring within 10 m), this design expands a range of high-quality monitoring.

According to the second aspect or the third aspect, in a possible design, an aperture value of the primary camera falls between 1.4 and 2.0, an aperture value of at least one secondary camera falls between 0.8 and 1.6, and an aperture value of at least one secondary camera is less than the aperture value of the primary camera. In some scenarios, when there is insufficient light in the distance, a wide-aperture secondary camera can be used to increase a light admitted amount for image collection, so that a remote camera can form a clearer image. In this way, image quality of a snapshot is improved, and target recognition is facilitated.

According to the second aspect or the third aspect, in a possible design, the selecting, from the images collected by the primary camera and the N secondary cameras, M images including a target object includes detecting, by using a primary-camera detection thread, that M1 images in images collected by the primary camera include the target object, storing the M1 images from a buffer, detecting, by using the primary-camera detection thread, that M2 images in images collected by the N secondary cameras include the target object, and storing the M2 images from the buffer, or detecting, by using a primary-camera detection thread, that M1 images in images collected by the primary camera include the target object, storing the M1 images from a buffer, detecting, by using a secondary-camera detection thread, that M2 images in images collected by the N secondary cameras include the target object, and storing the M2 images from the buffer, and recognizing the M1 images and the M2 images as the images including the target object, based on image photographing timestamps of the primary camera and the secondary cameras, target positions, and an image mapping relationship between the primary camera and each secondary camera, where M=M1+M2. The method may be performed by the foregoing selection module. In some scenarios, the primary-camera detection thread may be used to determine a detection target, and dominate storage of the images collected by the primary camera and the images collected by the secondary cameras. In these scenarios, it may be helpful for a monitoring system to determine an ID. In some other scenarios, storage of the images collected by the secondary cameras is dominated by the secondary-camera detection thread, to reduce thread load of the primary camera.

According to the second aspect or the third aspect, in a possible design, the monitoring system performs image detection based on all preset targets, and there may be one or more detected targets. In this case, one image may include a plurality of targets. Therefore, during target detection, identifier (ID) numbering needs to be performed on different targets. For images shot by different cameras, association and matching may be performed based on the image mapping relationship (a space correspondence) that is between the primary camera and each secondary camera and that is obtained through calibration, and information such as a timestamp (a time dimension) recorded by the monitoring system and a position (a space dimension) of a target, and same objects in the stored images match a same target. For any target, a preferred small image, especially an optimal small image, is found in a manner similar to the foregoing manner. Specifically, when X small images whose evaluation results rank top are sent to a front end for recognition or sent to a back-end server, the X small images whose evaluation results rank top may be packaged, and further, original images corresponding to the X small images may be packaged. Therefore, for any target, the unit can find a preferred small image corresponding to the target. Any object in the monitoring field of view can be presented in a form of a high-quality image, and this greatly improves monitoring quality and a monitoring capability.

According to the second aspect or the third aspect, in a possible design, ideal photographing parameters of the imaging cameras are calculated based on quality evaluation results of the images collected by the primary camera and the secondary cameras, where the ideal photographing parameters include exposure duration, a gain, a denoising parameter, and the like, and a photographing parameter of the primary camera or the secondary camera is adjusted based on a feedback.

According to a fourth aspect, an embodiment of this application provides a device. The device includes a plurality of cameras, a display, a processor, a memory, and a bus, and the plurality of cameras, the display, the processor, and the memory are connected by using the bus. The plurality of cameras are configured to collect images, the display is configured to display a video or an image, the memory is configured to store data and a program instruction, and the processor is configured to invoke the data and the program instruction, to collaborate with the cameras and the display to implement the method in any one of the foregoing aspects and the possible designs.

It should be understood that in any one of the foregoing possible designs, free combination may be performed between methods or between a method and an apparatus without violating a natural law.

In the present disclosure, the primary camera is used to collect monitoring videos, and a plurality of "long-focus" secondary cameras are used to collect snapshots. The secondary cameras cover the region monitored by the primary camera. The videos collected by the primary camera meet viewing requirements of human eyes. The snapshots collected by the secondary cameras are used for algorithm recognition. The secondary cameras may use a plurality of wide apertures to improve light sensitivity in a weak light environment. Optionally, overlapping and combination of a plurality of focal lengths increase a size of a remote monitored target and improve definition of the remote monitored target. A 4K level can be achieved in the monitoring field of view of the primary camera, and a wide dynamic range capability is improved in the regions monitored by the plurality of secondary cameras. In this way, low luminance, a small size of a target, and a disadvantage of a wide dynamic range in a monitoring application scenario can be well resolved.

DESCRIPTION OF EMBODIMENTS

The following clearly describes the technical solutions in the embodiments of this application with reference to the accompanying drawings in the embodiments of this application.

Figure 1:
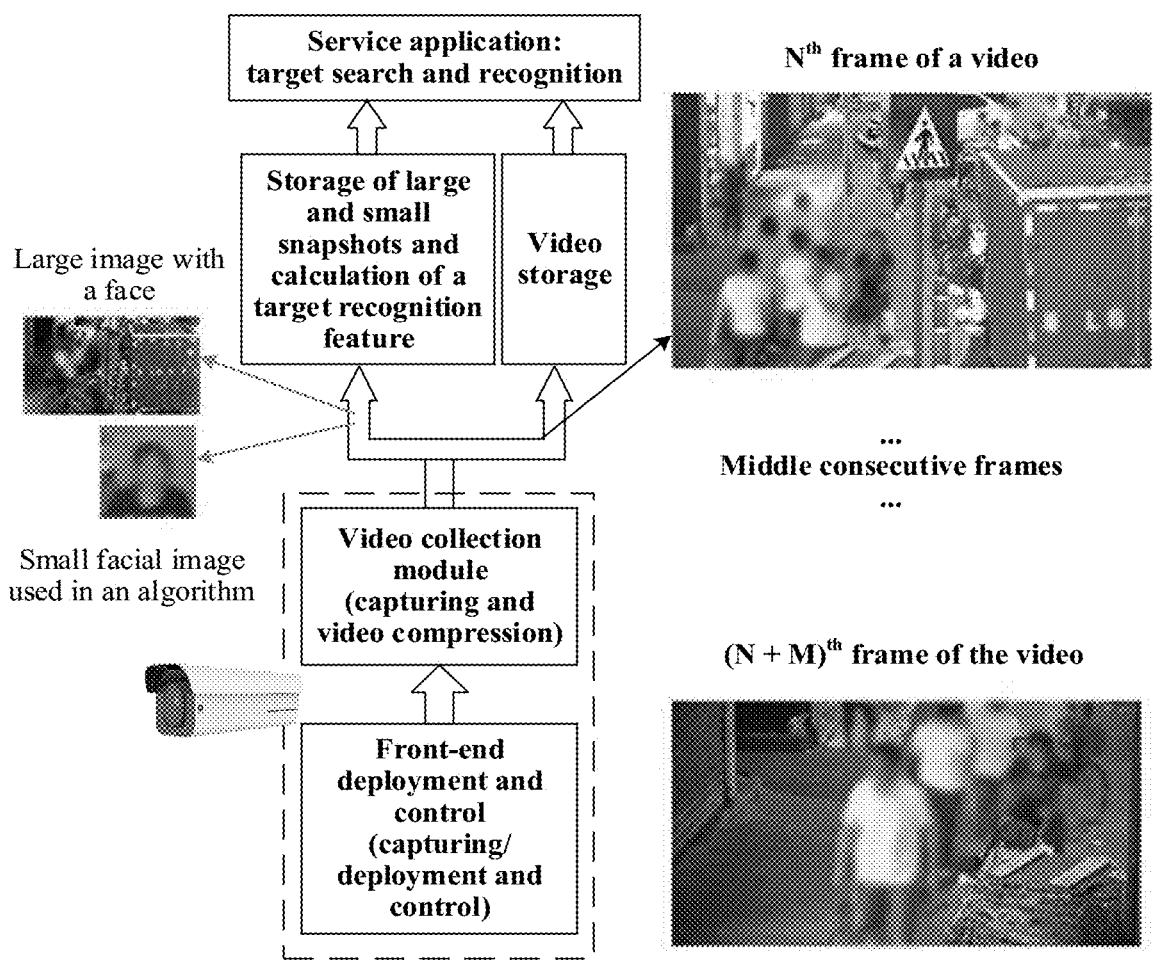
FIG. 1 is a schematic diagram of a technical solution of monitoring in other approaches.
Figure 2:
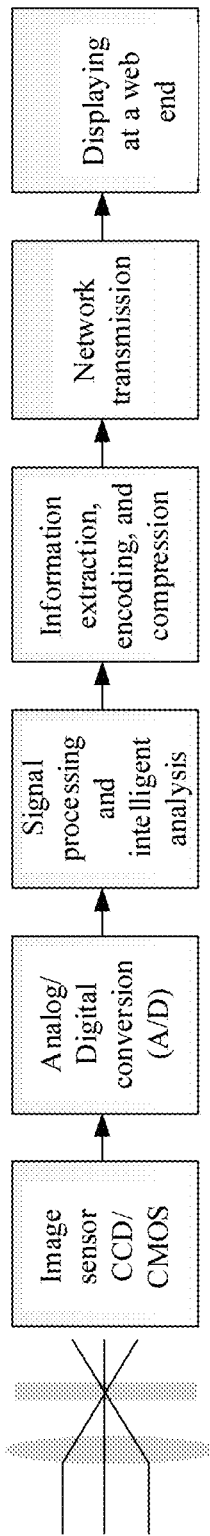
FIG. 2 is a schematic diagram of a signal flow of a monitoring system according to an embodiment of this application.

A monitoring system based on the embodiments of the present disclosure may be shown in FIG. 2. A photographing module collects an image (imaging on a charge-coupled device (CCD)/complementary metal-oxide-semiconductor (CMOS) image sensor), the image is converted into a digital signal through analog-to-digital conversion, signal processing and intelligent analysis are performed on the digital signal to obtain processed data, and information extraction, encoding, and compression are performed on the processed data, then data obtained after information extraction, encoding, and compression is transmitted to a web display end over a network, and after decoding is performed, visual data is displayed to a user.

The photographing module may also be understood as a photographing system, a photographing component, a shooting component, a shooting unit, a camera, a capture component, a capture unit, an imaging apparatus, an imaging unit, or the like. It should be understood that these are similar statements commonly used by a person skilled in the art, and details are not described and limited in the present disclosure.

Figure 3:
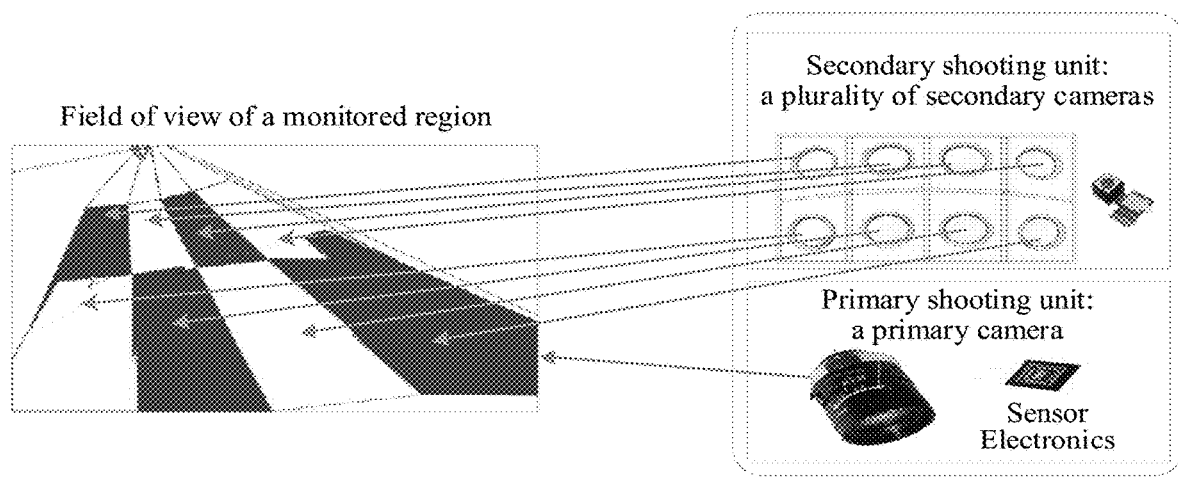
FIG. 3 is a schematic diagram of a monitoring and photographing module according to an embodiment of this application.

An implementation form of a monitoring and photographing module in the present disclosure may be shown in FIG. 3, and includes a primary shooting unit (which may also be referred to as a primary video shooting component or a primary camera) and a secondary shooting unit. The secondary shooting unit includes a plurality of secondary capture components (which may also be referred to as secondary cameras).

The primary camera may use a conventional monitoring video photographing component, and is configured to collect a video in a monitored region. The plurality of secondary cameras may use high-definition photographing components with different focal lengths and wide apertures, and are configured to collect images or snapshots in respective monitored regions. Further, field of view regions covered by the plurality of secondary cameras cover a region in which photographing quality of the primary camera is comparatively low but a user is interested. In this case, the plurality of secondary cameras need to be arranged according to a specific rule, to ensure that a field of view of the monitored region (for example, a black part and a gray part in a field of view of a monitored region in FIG. 3) in which the user is interested is completely covered, and avoid wasting comparatively large overlapping space between the secondary cameras. In the present disclosure, the plurality of secondary cameras are added to capture a clear image in an unclear region photographed by the primary camera, so that good monitoring performance can be achieved in the monitored region in which the user is interested.

For any monitored target, a snapshot obtained in a field of view region of the primary camera by using a target detection result may be a corresponding image in each image frame or some image frames of a video stream. Snapshots collected by the plurality of secondary cameras in respective field of view regions may be target snapshots obtained by a specific secondary shooting component in coverage of the secondary shooting component.

For all images that include the target and that are obtained by the primary camera and the secondary cameras, the same target may be recognized based on a time dimension and a space dimension, IDs are unified, and several images that include the same target are recognized. These several images are further cropped to obtain small images in which the target is more outstanding. Quality of these small images obtained after cropping is evaluated by using an image quality evaluation method from another approach, and a preferred small image is selected from the small images. Optionally, properness of imaging parameters of the primary camera and the secondary cameras may be evaluated based on a quality evaluation result, updated imaging parameters are fed back to the primary camera and the corresponding secondary cameras, and photographing parameters of the primary camera and the corresponding secondary cameras are adjusted to better adapt to a current environment. In this way, videos and snapshots with higher quality are collected.

Scenarios to which the present disclosure can be applied include but are not limited to the following two monitoring systems or environments.

(1) Facial Capture System/Environment.

Figure 4:
FIG. 4 is a schematic diagram of a sidewalk monitoring environment according to an embodiment of this application.
Figure 5:
FIG. 5 is a schematic diagram of a monitoring environment at a hall entrance/exit according to an embodiment of this application.

For a facial capture system installed on a sidewalk, as shown in FIG. 4, a monitored region is a narrow and long region, and for a remote target face, a problem of a small size of a target image exists. Consequently, the face cannot be recognized clearly by using a photographing solution from another approach. In addition, for facial capture at a hall entrance/exit, as shown in FIG. 5, because of a strong contrast between indoor light and outdoor light, a large dynamic range of an image, and same imaging parameters, an image of a target facial region is dark and cannot be recognized. In the present disclosure, a design solution of "one primary camera+a plurality of secondary cameras" may be used. The plurality of secondary cameras can resolve a problem of a small size of a remote target. In addition, the plurality of secondary cameras may perform imaging by region, to further resolve a problem that an image of a target region is dark in a wide-dynamic-range scenario.

(2) Motor Vehicle, Non-Motor Vehicle, and Pedestrian Capture System.

The motor vehicle, non-motor vehicle, and pedestrian capture system used for public security monitoring needs to detect, track, and classify motor vehicles, non-motor vehicles, and pedestrians in a large field of view range. However, a severe problem of missed detection occurs for small targets at an edge of the field of view. Due to uneven luminance in the field of view range, lack of luminance in some areas leads to low luminance of a collected image. For example, an image is blurred and noise is loud in low-luminance scenarios such as in the evening and on cloudy/rainy days. In the present disclosure, according to a design of "one primary camera+a plurality of secondary cameras", the plurality of secondary cameras can resolve a problem of a small size of a target at an edge of a field of view, and the plurality of secondary cameras are used to perform imaging by region, to resolve a problem that an image of a target region is dark in a wide-dynamic-range scenario. In addition, a wide-aperture design may be used for the plurality of secondary cameras, to resolve problems of a blurred image and loud noise in a low-luminance scenario.

A form of a product implemented based on the present disclosure may be a monitoring system, or may include parts such as a photographing component/system/module in a monitoring system. A structure of the monitoring system in the present disclosure may be shown in FIG. 6, and mainly includes a primary shooting unit 101, a secondary shooting unit 102, a multi-channel image signal processor (ISP) processing unit 103, a multi-channel collaborative processing unit 104, a video/an image encoding unit 105, a transmission unit 106, and a display unit 107.

The primary shooting unit 101 includes a primary camera (a primary video shooting component), may use a conventional video surveillance module or component, and is configured to collect global image data by monitoring a field of view of the primary camera. During image collection, a shooting frame rate is usually not less than 25 fps, and can be increased as required provided that resources such as bandwidth and storage meet requirements. The primary shooting unit 101 is mainly responsible for collecting a real-time video stream in the monitoring field of view to meet viewing requirements of human eyes.

In a specific implementation process, for example, a focal length of a lens of the primary video shooting component may be any value within 4 mm to 10 mm, and the lens of the primary video shooting component may be a prime lens or a motorized zoom lens. Because a focal length of the motorized zoom lens is adjustable, a focal-length range of the entire lens may exceed the foregoing range, and for example, may be 2.8 mm to 50 mm. It should be understood that the lens should be adjusted within a specific range in a working process, for example, within 4 mm to 10 mm. After the system is installed, once the primary camera starts to work continuously in a specific mode, the primary camera may be understood as a prime lens. A range of an aperture value Fno may be between 1.0 and 2.0. For example, Fno=1.4. An optical sensor of the lens may have at least 2 megapixels. It should be understood that the prime lens can have higher stability and reduce and adjust energy consumption, and the zoom lens can provide more functions. Whether the primary camera is a prime lens or a zoom lens is not limited in the present disclosure.

As a description, the focal length in this application may be an equivalent focal length commonly used in the industry, and parameters in the embodiments of the present disclosure are merely examples and are not limited.

Secondary shooting unit 102.

The secondary shooting unit 102 includes a plurality of secondary cameras (secondary capture components). The component may include a lens, a sensor, an enclosure, and the like. A shooting frame rate during image collection is lower than that of the primary camera to reduce power consumption. Optionally, the secondary camera may use a prime lens, or may use a zoom lens. However, a focal length of any secondary camera during image collection needs to be greater than a focal length of the primary camera during image collection, so as to clearly obtain an image of a comparatively remote region.

In a specific implementation process, the plurality of secondary cameras may have different focal lengths. For a region that is comparatively far away from an installation position in a monitoring field of view, a long-focus lens may be used. For example, an equivalent focal length may be range from 15 mm to 30 mm, and may be specifically 18 mm, 21 mm, or 24 mm. In this way, it is ensured that a size of an obtained image of a target of interest meets a requirement. For a region that is close to the installation position in the monitoring field of view, a medium/short-focus lens is used. For example, an equivalent focal length may range from 6 mm to 15 mm, and may be 8 mm, 10 mm, or 12 mm. It should be understood that the medium/short-focus lens has a large field of view and performs monitoring at a relatively short distance. The long-focus lens has a small field of view and can perform monitoring at a relatively long distance. A wide-aperture design may be used for lenses of the plurality of secondary cameras, for example, Fno=0.8, Fno=1.0, Fno=1.2, or Fno=1.5, to increase an amount of light sensed in a low-luminance scenario and improve an imaging effect in the low-luminance scenario. It should be understood that the focal length and the aperture value further determine a depth of field. A quantity of secondary cameras is determined based on a to-be-covered field of view of the primary camera and fields of view of the secondary cameras. For example, a larger monitoring field of view that needs to be covered indicates a larger quantity of secondary cameras. In addition, a longer monitoring distance indicates a larger quantity of rows of secondary cameras. For example, a monitored region of 10 m to 20 m needs to be covered by one row of secondary cameras, for example, three secondary cameras with a focal length of 8 mm, and a monitored region of 20 m to 30 m needs to be covered by another row of secondary cameras, for example, four 21-mm secondary cameras. In actual application, all of the secondary cameras may be referred to as "long-focus lenses" relative to the primary camera.

Field of view/photographing regions of the plurality of secondary cameras can cover a region that cannot be photographed clearly by the primary camera but that a user is interested in (that needs to be monitored emphatically). The region may be understood as a supplementary monitored region, and is freely defined by the user based on a monitoring requirement, to compensate for a region unclearly photographed by the primary camera in the monitored region, and enhance a monitoring capability of the primary camera in the entire monitoring field of view. It should be understood that the plurality of secondary cameras should exert respective maximum photographing capabilities as much as possible. In an ideal case, an entire target region is monitored by using a minimum quantity of secondary cameras. However, during actual implementation, there may be a small overlapping part between regions photographed by the plurality of secondary cameras. The secondary cameras are disposed to ensure that a face image collected at a long monitoring distance (for example, 20 m) has more than 50×50 pixels, and a snapshot with quality reaching 4K is obtained, meeting high-standard requirements for identifying important targets such as a face. In this way, a lack of the monitoring capability of the primary camera can be greatly compensated for.

It should be understood that not all of the region monitored by the primary camera needs to be covered by the secondary camera. In actual application, an excessively remote place in the region monitored by the primary camera may be considered as a region in which a user is not interested or to which a user pays no attention, or a region that is not helpful for monitoring. These regions are usually located at edges of a monitoring video. All regions except these edge regions may be understood as monitored regions to which the user pays attention. Usually, the primary camera takes a comparatively clear picture of a short-distance target, but quality of a picture of a comparatively remote place in the monitored region to which the user pays attention is comparatively poor. Therefore, the secondary cameras are installed and deployed to cover this part, to compensate for a lack of the monitoring capability of the primary camera in the comparatively remote place. For example, in an optional example, a comparatively long distance may be defined as a horizontal distance of 5 m to 25 m to the monitoring and photographing module.

A combination manner of the primary camera and the secondary cameras may be flexibly defined by a user based on a specific requirement, and for example, may be "one primary camera (short-distance monitoring)+N secondary cameras (long-distance monitoring)" or "one primary camera (short-distance monitoring)+N1 secondary cameras (medium/long-distance monitoring)+N2 secondary cameras (long-distance monitoring)". N, N1, and N2 are positive integers greater than or equal to 2. In addition, the primary camera and the secondary cameras are usually placed downward.

In a specific implementation process, for an overlapping region between a region photographed by the primary camera and regions photographed by the secondary cameras, that is, for substantially same photographed regions, sizes of actually obtained images are different. For example, for a remote target, an actual image photographed by the primary camera is smaller, and an actual image photographed by a secondary camera is larger because the secondary camera uses a "long-focus lens". Because the sizes of the actually collected images of the same target are different, a mapping relationship between the images collected by the two cameras needs to be determined, which is specifically a correspondence between positions in the images. The mapping relationship may be determined through calibration. For a calibration method, various existing methods may be used, including feature point calibration and the like. The mapping relationship is used to determine whether targets in images obtained by different cameras are in a same position, and then determine, with reference to a time factor, whether the targets are a same target. The mapping relationship may be provided before delivery of an implemented product or obtained by using an algorithm. The mapping relationship obtained through calibration may also be periodically calibrated during use. For example, an automatic calibration method based on feature point matching may be used.

Multi-Channel ISP Processing Unit 103.

The multi-channel ISP processing unit 103 receives image data collected by the primary camera and the plurality of secondary cameras, that is, RGB image data of a raw domain. This unit can perform image processing operations such as demosaicing, 3A, denoising, and RGB-to-YUV conversion on the RGB data to obtain YUV image data, that is, YUV image data corresponding to the primary camera and YUV image data corresponding to the secondary cameras. Parameters of the AE and the AWB can be automatically adjusted based on luminance and color of the image. The processing in the raw domain facilitates subsequent encoding and decoding processing on the image.

In addition, the multi-channel ISP processing unit 103 may also be connected to an external buffer to store the YUV data and process data of previous intermediate processing.

The multi-channel collaborative processing unit 104 includes a multi-channel target detection and tracking unit 1041 and a multi-channel preferred-snapshot selection unit 1042.

The multi-channel target detection and tracking unit 1041 receives the YUV data obtained by the multi-channel ISP processing unit 103. The YUV data includes the YUV image data corresponding to the primary camera and the YUV image data corresponding to the secondary cameras. Target detection and tracking are performed for these images data. A target herein includes but is not limited to a motor vehicle, a non-motor vehicle, a pedestrian, a face, an important object, or the like, and is related to a monitoring requirement.

Specifically, target detection and tracking are performed for the YUV image data from the primary camera, and a target ID and a target position in each frame of image are recorded to form a target track. The target position may be expressed by using two-dimensional coordinate values in the image, for example, pixel coordinates. In an image detection method, a deep learning network may be used for analysis. Target detection is performed for YUV image data obtained by each secondary camera, and a target ID and a target position in each detection frame are recorded. The processing may be performed immediately each time the multi-channel ISP processing unit 103 completes converting one image.

In a specific implementation process, the unit may include a detection thread for detecting the images collected by the primary camera, that is, a primary-camera detection thread, may include a detection thread for detecting the images collected by the secondary cameras, that is, a secondary-camera detection thread, or may include a detection thread that can detect both the images collected by the primary camera and the images collected by the secondary cameras, that is, a master detection thread. For example, after detecting a target, the primary-camera detection thread sends a feedback to the multi-channel ISP processing unit, to store, from a buffer, a YUV image that is corresponding to the primary camera and that includes the target. For example, after detecting a target, the secondary-camera detection thread sends a feedback to the multi-channel ISP processing unit 103, to store, from a buffer, a YUV image that is corresponding to the secondary camera and that includes the target. For example, after detecting a target, the master detection thread sends a feedback to the multi-channel ISP processing unit 103, to store, from a buffer, YUV images that are corresponding to the primary camera and the secondary camera and that include the target. It should be understood that, for a frame in which no target is detected, a feedback is sent to the multi-channel ISP processing unit 103 to discard the frame from the buffer.

In conclusion, a plurality of stored images may be obtained by using the multi-channel target detection and tracking unit 1041. In addition, the unit records information such as an ID of each target in these images and a position of each target.

Optionally, the multi-channel target detection and tracking unit 1041 may further control photographing frequencies of the primary camera and the secondary cameras based on a type of the detected target. For example, when a vehicle is detected, a photographing frame rate increases. When a pedestrian is detected, a photographing frame rate decreases.

Multi-channel preferred-snapshot selection unit 1042. For images stored in a previous module, association and matching may be performed based on an image mapping relationship (a space correspondence) that is between the primary camera and each secondary camera and that is obtained through calibration, and based on information such as a timestamp (a time dimension) recorded by a monitoring system and a position (a space dimension) of a target. If same objects in the stored images match a same target, the objects are provided with a same ID value (which is subject to an ID number in the image collected by the primary camera). Optionally, when at least two objects appear at a same time and in a same position, a feature matching calculation method may be additionally used to perform matching on targets. New ID values are allocated to different targets. For example, for an overlapping region between the image collected by the primary camera and an image collected by the secondary camera, if a target that is not recorded or recognized in a snapshot from the primary camera exists in a snapshot from the secondary camera, the target is used as a new target in the region monitored by the primary camera, and a new number is assigned to the new target. Certainly, a possibility of this case is extremely low.

In the images stored by the multi-channel target detection and tracking unit 1041, it is assumed that the multi-channel preferred-snapshot selection unit 1042 performs ID matching, and learns that there are M images including a target object (a specific target may be any target detected by the monitoring system, or may be related to a user requirement). Then the M images need to be cropped based on the target object to obtain M small images including the target object. For example, a small image that can significantly present a target feature is obtained through cropping based on a size or an outline of the target object. A shape of the small image may be a square, a circle, or a contour of the target object. Cropping is to separate a part of a picture or an image from the original picture or image, and may also be understood as matting. Available methods include quick mask, conversion of a path drawn with a pen tool into a selection, extraction by a filter, extraction by an external filter, a channel tool, calculation, image application, direct selection such as region-specific cropping, a lasso tool, a frame selection tool, or an eraser tool, and the like. A shape of the image obtained through cropping in the present disclosure may be an outline of the target object, a square, a circle, or another form of shape.

For the M small images corresponding to the target object, a quality evaluation algorithm based on deep learning may be used to obtain a quality evaluation result corresponding to the target object. X small images whose quality evaluation results rank top may be selected from the M small images based on a preset requirement and the quality evaluation results. Specifically, for example, for the target object, a small image with a best quality evaluation result is selected. The optimal small image may be a snapshot obtained by the primary camera, or may be a snapshot obtained by a secondary camera. This is determined by a quality evaluation result or an algorithm.

For the target object, the X small images whose quality meets a condition may be obtained after processing is performed by the multi-channel preferred-snapshot selection unit 1042. For subsequent identification and verification of the monitoring system, the multi-channel preferred-snapshot selection unit 1042 further stores original images corresponding to the X small images from the M images corresponding to the target object.

An objective of this unit is to find a preferred small image, especially an optimal small image, for any target in the foregoing similar manner. Specifically, when the X small images whose evaluation results rank top are sent to a front end for recognition or sent to a back-end server, the X small images whose evaluation results rank top may be packaged, and further, the original images corresponding to the X small images may be packaged. Therefore, for any target, the unit can find a preferred small image corresponding to the target. Any object in the monitoring field of view can be presented in a form of a high-quality image, and this greatly improves monitoring quality and a monitoring capability.

Optionally, the structure of the monitoring system in the present disclosure may further include an imaging parameter generation and feedback control unit 1043.

A quality evaluation result from the multi-channel preferred-snapshot selection unit 1042 includes a result of evaluating imaging quality of images collected by the primary camera and the plurality of secondary cameras. The imaging quality includes brightness, a contrast, a blurring degree, a noise level, and the like of an image. Based on the evaluation result and an expected imaging effect, ideal photographing parameters of the imaging cameras may be calculated, including exposure duration, a gain, a denoising parameter, and the like. In addition, the ideal photographing parameters are fed back to the primary camera and the secondary cameras by using the multi-channel ISP processing unit 103, to adjust current photographing parameters of the cameras. The cameras are adjusted by using photographing parameters corresponding to high imaging quality, and this feedback may be continuous.

Video/image encoding unit 105. This unit can perform video encoding on an image, that is, video data, that is collected by the primary camera and that is obtained after ISP processing, and perform image encoding on image data that is collected by each secondary camera and that is obtained after ISP processing. In addition, image encoding may be further performed on a preferred image of a preferred target object, and image encoding may also be performed on an original image of the preferred image of the preferred target object. The encoded data may be transmitted in a manner such as by using a network. A mainstream format such as an H.264 format, an H.265 format, or an audio and video coding standard (AVS) format may be used as a video encoding format. An encoding format such as a joint photographic experts group (JPEG) format or a portable network graphics (PNG) format may be used for image encoding.

Transmission Unit 106.

The transmission unit 106 is configured to transmit an encoded video and image.

Display Unit 107.

The display unit 107 is configured to decode and display the transmitted encoded video and image. For example, a video is displayed in a main display region on a video's web display interface, and some snapshots of a target, especially preferred snapshots of the target, may be displayed in a peripheral region of the video.

In a specific implementation process, a real-time monitoring image is presented on the display interface, for example, a monitoring preview video stream collected by the primary camera in real time. Optionally, some images collected by the secondary cameras in real time may also be displayed. Optionally, the monitoring system detects and tracks a target in the displayed real-time video stream from the primary camera. For example, a prompt box is displayed for any target object on the image, and a preferred small image of the target object may also be displayed around a video display region. If verification is required, an original image corresponding to the target object is displayed. In some implementation scenarios, for example, when there is no monitored person or there are excessive monitored targets, some preferred images may not be displayed until there is a data invoking requirement.

Figure 6:
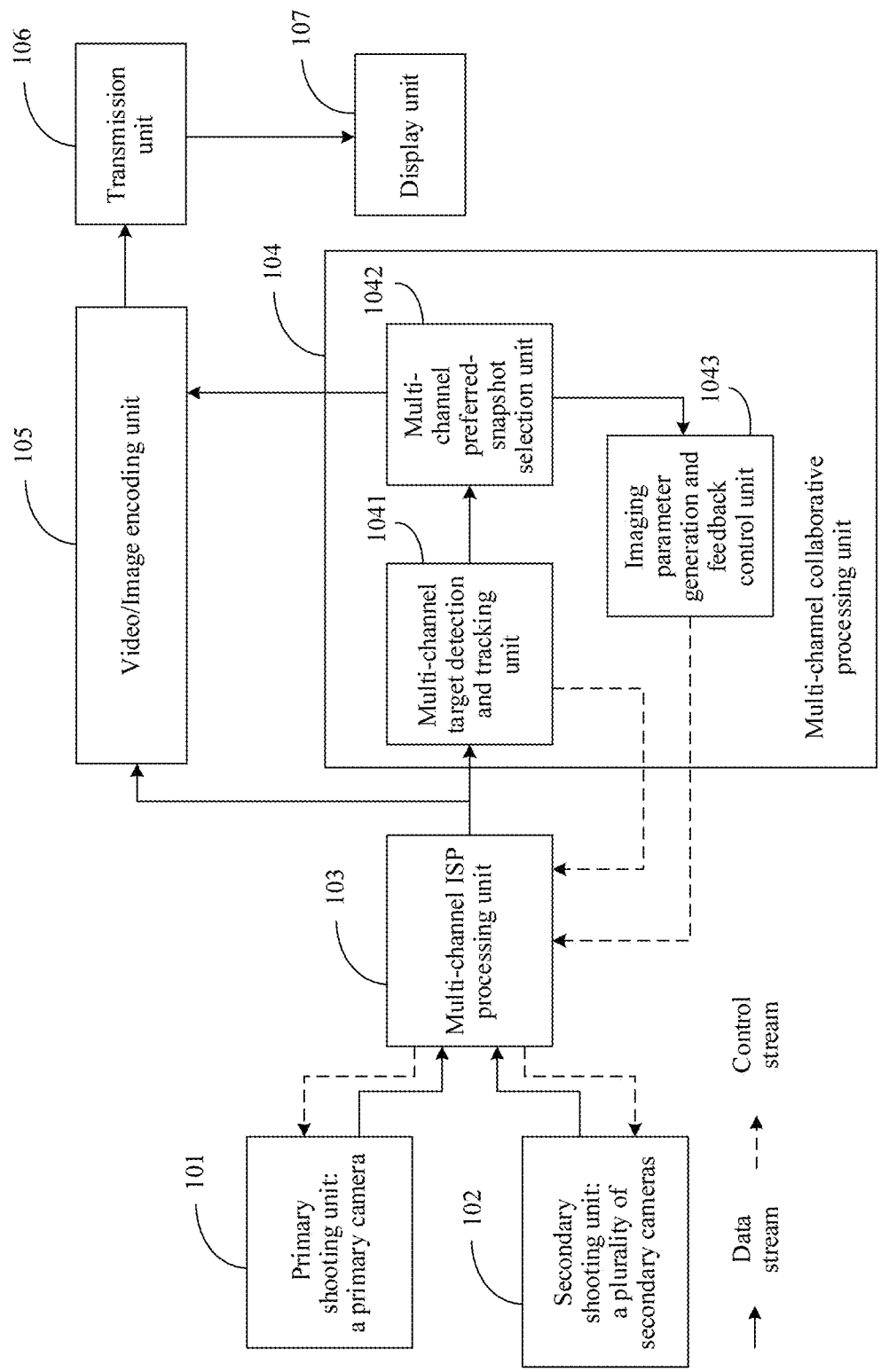
FIG. 6 is a schematic structural diagram of a monitoring system according to an embodiment of this application.
Figure 7:
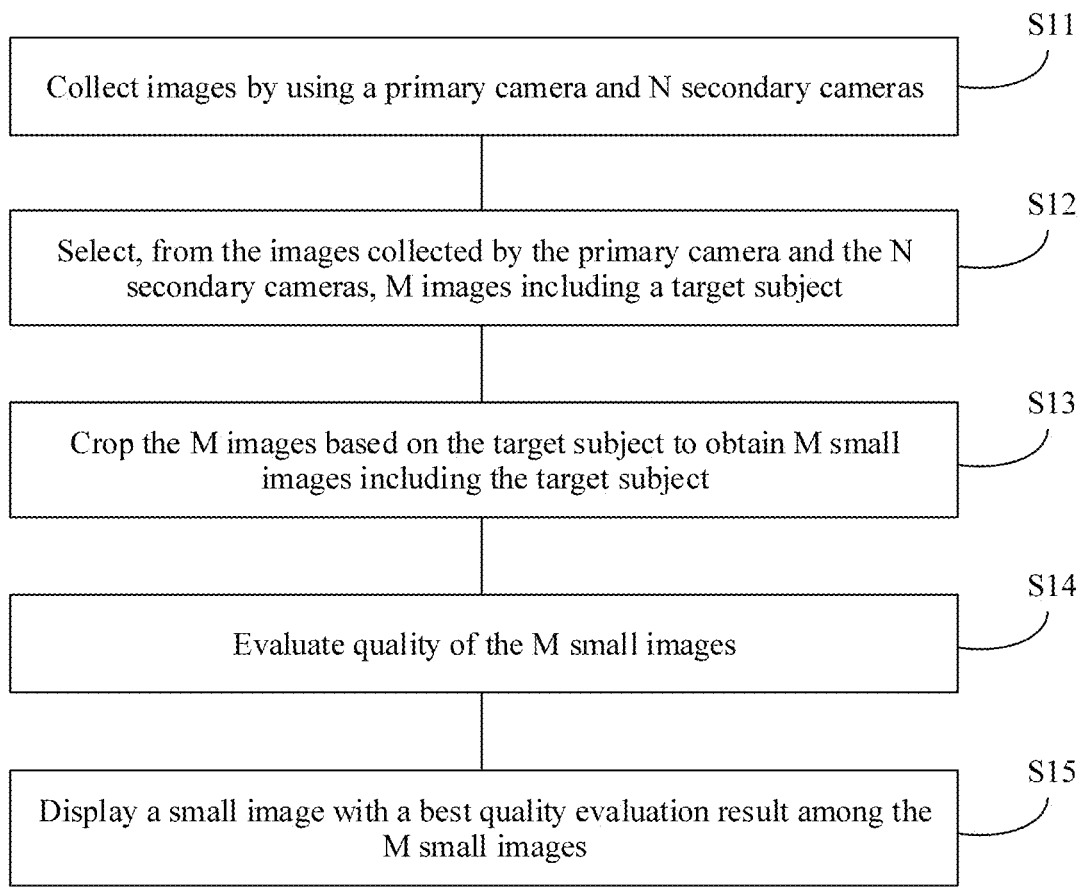
FIG. 7 is a schematic diagram of a monitoring method according to an embodiment of this application.

A data stream and a control stream in the present disclosure are described with reference to FIG. 6.

The primary camera 101 collects a real-time video stream at a first frame rate, the multi-channel ISP processing unit 103 processes the real-time video stream, the video/image encoding unit 105 may perform video encoding on processed data, the transmission unit 106 transmits encoded data, and the display unit 107 decodes the data and displays the video stream obtained through monitoring by the primary camera. The multi-channel target detection and tracking unit 1041 further performs target detection on processed data. When it is detected that a target (for example, a to-be-recognized object preset by a user, such as a vehicle or a person) exists in any image, a feedback is sent to the multi-channel ISP processing unit 103, and the image is stored from a system buffer. It is assumed that, within a monitoring time period, there are a total of M11 images continuously collected by the primary camera 101, and there are M12 stored images (which are already in a YUV format) including a target (which may be any preset to-be-recognized object or some preset to-be-recognized objects). It should be understood that an image that does not include any target may be discarded.

Any secondary camera 102 collects real-time image data at a second frame rate (lower than the first frame rate). The multi-channel ISP processing unit 103 processes the image data. The multi-channel target detection and tracking unit 1041 performs target detection on processed image data. When it is detected that a target (for example, a to-be-recognized object preset by a user, such as a vehicle or a person) exists in any image, the image is stored from the system buffer. It is assumed that, within a monitoring time period, there are a total of M21 images collected by all the secondary cameras 102, and there are M22 stored images (which are already in a YUV format) including a target (which may be any preset to-be-recognized object or some preset to-be-recognized objects). It should be understood that an image that does not include any target may be discarded. Optionally, the video/image encoding unit 105 may perform video or image encoding on the YUV image data corresponding to the secondary cameras, the transmission unit 106 transmits encoded image data, and the display unit 107 decodes the encoded image data and displays an image data stream obtained through monitoring by the secondary cameras. It should be understood that the data may not be transmitted to the display unit 107, or may be transmitted to the display unit 107 but is not displayed, to save storage resources and display resources.

For the M12 images obtained and stored by the primary camera and the M22 images obtained and stored by the secondary cameras, the multi-channel preferred-snapshot selection unit 1042 may perform association and matching based on the image mapping relationship (the space correspondence) that is between the primary camera and each secondary camera and that is obtained through calibration and the information such as the timestamp (the time dimension) recorded by the monitoring system and the position (the space dimension) of the target. If same objects in the stored images match a same target, the objects are provided with a same ID value. In other words, which targets in the stored images are a same target is identified. It is assumed that the M12 images include M13 images including a specific target object (which may be related to a user requirement), where M11≥M12≥M13, and the M22 images include M23 images including the target object, where M21≥M22≥M23. In other words, a total of (M13+M23) images (which may be understood as original images of the target object) including the target object are obtained.

The multi-channel preferred-snapshot selection unit 1042 crops the M13 images based on the target object to obtain M13 small images including the target object, so as to present the target object more intuitively and effectively. The multi-channel preferred-snapshot selection unit 1042 crops the M23 images based on the target object to obtain M23 small images including the target object, so as to present the target object more intuitively and effectively.

The multi-channel preferred-snapshot selection unit 1042 obtains the M13 images (original images), the M13 small images, the M23 images (original images), and the M23 small images. The multi-channel preferred-snapshot selection unit 1042 evaluates quality of the M13 small images and the M23 small images to obtain X preferred small images. The multi-channel preferred-snapshot selection unit 1042 transmits the X small images and X original images corresponding to the X small images to the video/image encoding unit 105 for image encoding. The transmission unit 106 transmits the images to the display unit 107. The display unit 107 may decode and display only the X small images, and optionally, may also decode and display the X original images. It should be understood that the original image includes richer image details and backgrounds, facilitating verification and revision of a monitoring result. In some scenarios, the original image may be stored on a terminal side on which the display unit is located and is not displayed in real time, to save a display area.

Optionally, the multi-channel preferred-snapshot selection unit 1042 sends an imaging quality evaluation result to the imaging parameter generation and feedback control unit 1043. The imaging parameter generation and feedback control unit 1043 evaluates, in combination with the quality evaluation result of the multi-channel preferred-snapshot selection unit 1042, imaging quality of the images collected by the primary camera and the plurality of secondary cameras. The imaging quality includes brightness, a contrast, a blurring degree, a noise level, and the like of an image. Based on the evaluation result and an expected imaging effect, ideal photographing parameters of the imaging cameras may be calculated, including exposure duration, a gain, a denoising parameter, and the like. In addition, the ideal photographing parameters are fed back to the primary camera and the secondary cameras by using the multi-channel ISP processing unit, to adjust current photographing parameters of the cameras.

In an implementation process of the present disclosure, the monitoring and photographing module needs to be first installed.

An establishment mode of the monitoring and photographing module in the present disclosure is "one primary camera+N secondary cameras". In some examples, the N secondary cameras may further include a medium/short-focus secondary camera and/or a long-focus secondary camera. Parameters such as focal lengths of different medium/short-focus secondary cameras may be the same or may be different. Parameters such as focal lengths of different long-focus secondary cameras may be the same or may be different. There may be only the medium/short-focus secondary camera or the long-focus secondary camera. The quantity N of secondary cameras may be any integer not less than 2.

For example, a monitoring and photographing module uses "one primary camera (6 mm)+four secondary cameras (15 mm)+three secondary cameras (8 mm)". A core idea of camera installation is to "cover a monitored region in which a user is interested and collect complete high-definition images of targets in the monitored region". A specific camera parameter design and a specific quantity of cameras are determined jointly by factors such as region coverage, a field of view of a camera, a camera installation height, user requirements for quality of collected images, and a monitoring distance. The primary camera may be a conventional video surveillance component or camera. For example, a focal length of a lens may change within a range of 2 mm to 8 mm in a motorized zoom manner (which may be fixed to about 6 mm during actual working), an aperture Fno is equal to 1.4, and a sensor has 2 megapixels. The primary camera is configured to collect global image data in real time in a field of view region. If a secondary camera is expected to monitor a region far away from a camera installation position, the secondary camera may use a long-focus lens to ensure that a size of a target of interest meets a requirement. If the secondary camera is expected to monitor a region close to the camera installation position in the field of view, the secondary camera may use a medium/short-focus lens. A wide aperture with a value ranging from 0.6 to 1.5 may be used for the lens of the secondary camera, for example, Fno=0.8, Fno=1.2, or Fno=1.5, to increase an amount of light sensed in a low-luminance scenario and improve an imaging effect in the low-luminance scenario.

For another possible design specification, refer to the following one primary camera+four long-focus secondary cameras+four medium/short-focus secondary cameras.

A total field of view of the primary camera is greater than 60°, an overlapping angle between the medium/short-focus secondary cameras is greater than 1.6°, and an overlapping angle between the long-focus secondary cameras is greater than 1°. An optional requirement is to ensure that an overlapping region between adjacent secondary cameras can completely cover a detection object of a specific type, for example, a face, to ensure that there is no blind spot in monitoring. It should be understood that a field of view of a secondary camera is related to the field of view of the primary camera and a quantity of secondary cameras. For example, when a field of view value of the primary camera is fixed, a larger quantity of secondary cameras indicates a smaller field of view of the secondary camera, and vice versa.

In a specific implementation process, an equivalent focal length of the primary camera may range from 2 mm to 8 mm, and a typical value of the equivalent focal length is 6 mm or 8 mm. When a monitoring distance is less than 5 m, a collected face image has far more than 50×50 pixels. An equivalent focal length of the medium/short-focus secondary camera may range from 6 mm to 15 mm, and a typical value of the medium/short-focus secondary camera is 10 mm or 12 mm. When a monitoring distance ranges from 5 m to 15 m, a collected face image has far more than 50×50 pixels. An equivalent focal length of the long-focus secondary camera may range from 15 mm to 25 mm, and a typical value of the long-focus secondary camera is 18 mm, 21 mm, or 24 mm. When a monitoring distance ranges from 15 m to 25 m, a collected face image has far more than 50×50 pixels. This design can ensure that a collected face image has more than 50×50 pixels within 25 m, and a 4K snapshot can be obtained. However, in other approaches, if only one camera is used, a high-definition snapshot can be ensured within only 5 m, and definition of a snapshot in another range becomes poor. As a result, performance of a monitoring system is greatly reduced.

It should be understood that a requirement for a monitoring range in a longitudinal direction of an entire monitoring field of view affects focal lengths of the secondary cameras and a quantity of rows of the secondary cameras, and a requirement for a monitoring range in a horizontal direction of the entire monitoring field of view affects angles of view of the secondary cameras. Consequently, a specific quantity of secondary cameras is affected.

The foregoing specific instances are merely used as an example, and are not limited.

In addition, a mapping relationship may be established through calibration between a monitored region covered by any secondary camera and an overlapping monitored region of the primary camera. In other words, for the same monitored region, a mapping relationship needs to be established between images collected by the primary camera and the secondary camera. A calibration method may be an existing method, including feature point calibration or the like. The mapping relationship may be initialized and calibrated on a monitoring device installation site, or may be set before delivery of a monitoring device. After installation is completed, the mapping relationship is confirmed and corrected based on a field of view scene of a camera installation site.

After a photographing system is installed, a monitoring system starts to collect images, detects and tracks a target, selects images, and finally presents a preferred snapshot on a screen.

The following uses examples to further describe the embodiments of the present disclosure. The examples are applied to a monitoring and photographing module. The monitoring and photographing module includes one primary camera and N secondary cameras. Regions monitored by the N secondary cameras respectively cover N different regions in a region monitored by the primary camera, and a focal length used when any secondary camera takes an image is greater than a focal length used when the primary camera takes an image, where N is an integer not less than 2.

Example 1

S11. The primary camera and the N secondary cameras collect images.

In a specific implementation process, image data collected by the primary camera at a first frame rate (for example, not less than 25 fps) in a monitoring field of view region covered by the primary camera may be understood as a video, and image data collected by each secondary camera at a second frame rate (for example, ranging from 0.5 fps to 25 fps) in a monitoring field of view region covered by the secondary camera may be understood as an image. The second frame rate is less than the first frame rate, and the secondary camera obtains the image data in a manner similar to photographing. In addition, the secondary camera may select different frame rates based on different types of monitored targets or different monitoring scenarios. For example, a photographing frame rate ranging from 0.5 fps to 3 fps may be selected when a person in a hall, on a stair, or the like is monitored. A frame rate ranging from 1 fps to 5 fps may be selected when a sidewalk is monitored. A frame rate ranging from 3 fps to 10 fps may be selected when a vehicle is monitored. The video collected by the primary camera and RGB images collected by the secondary cameras are converted into YUV image data after ISP processing, and correspondingly, the YUV image data may be referred to as YUV image data of the primary camera and YUV image data of the secondary cameras.

S12. Select, from the images collected by the primary camera and the N secondary cameras, M images including a target object.

In a specific implementation process, the YUV image data that is obtained after ISP processing and that is corresponding to the primary camera and the plurality of secondary cameras, namely, the YUV image data of the primary camera and the YUV image data of the secondary cameras, is received, and target detection and tracking are performed for each frame of image. The target herein may include a key monitored object such as a motor vehicle, a non-motor vehicle, a pedestrian, or a face. Target detection is performed for each frame of YUV image data of the primary camera, and target detection is performed for YUV image data of each secondary camera. A target detection method may be an image analysis method or a neural network determining method.

In a specific implementation process, when the multi-channel target detection and tracking unit 1041 performs target detection, if the multi-channel target detection and tracking unit 1041 detects that a target (for example, a to-be-recognized object preset by a user, such as a vehicle or a person) exists in an image, the multi-channel target detection and tracking unit 1041 sends a feedback to the multi-channel ISP processing unit 103. The image is stored from the system buffer. Based on the description of the foregoing instance, it should be understood that the multi-channel target detection and tracking unit 1041 may store not only the YUV image data corresponding to the primary camera but also the YUV image data corresponding to the secondary cameras. It is assumed that M0 images including the target are stored within a monitoring time period.

Target tracking is performed for the stored YUV image data of the primary camera, and a target ID and a target position of each target in each frame of image are recorded, to form a target track for a same target. Target tracking is performed for the stored YUV image data of each secondary camera, and a target ID and a target position of each target in each frame of image are recorded, to form a target track. A tracking method may be, but is not limited to, bidirectional optical flow tracking, Kalman prediction, and a Hungary matching algorithm. It should be understood that the target ID may be marked through numbering with a digit or a letter, and data numbering manners in any different cameras may be the same or may be different. To make a difference during subsequent signal processing, target IDs are usually recorded in different manners for images collected by different cameras. In addition, a manner of recording the target position may be but is not limited to marking with coordinates.

Association and matching are performed between each frame of stored image (which may be referred to as a snapshot from the primary camera) obtained by the primary camera and each stored image (which may be referred to as a snapshot from the secondary camera) obtained by each secondary camera, based on information such as an image photographing timestamp, a target position, and the image mapping relationship, obtained through calibration, between a region photographed by the primary camera and a region photographed by each secondary camera, to recognize a same target in different images and provide a same ID value for the same target obtained through matching. In other words, an association relationship is established for the same target. New ID values are allocated to different targets, especially a lost target or an unrecognized target (recorded or recognized in an image collected by another camera) in an image collected by a specific camera. Optionally, when at least two objects appear at a same time and in a same position, a feature matching algorithm may be used to further determine which targets in different images are a same target. In addition, if the master detection thread sends a feedback to the multi-channel ISP processing unit 103 to store the images collected by both the primary camera and the secondary camera, a same ID may be directly provided for a same target photographed by both the primary camera and the secondary camera.

According to the foregoing method, for a specific target or a specific target ID, namely, a target object, several images, for example, M images, including the target object may be determined from the foregoing stored M0 images including the target.

S13. Crop the M images based on the target object to obtain M small images including the target object.

A target image needs to be significantly presented in a monitoring system, to help a user perceive monitoring data. Therefore, the M images need to be cropped based on the target object, and redundant irrelevant information is removed, to obtain the M small images including the target object. For example, a small image that can significantly present a target feature is obtained through cropping based on a size or an outline of the target object. A shape of the small image may be a square, a circle, or a contour of the target object. Cropping is to separate a part of a picture or an image from the original picture or image, and may also be understood as matting. Available methods include quick mask, conversion of a path drawn with a pen tool into a selection, extraction by a filter, extraction by an external filter, a channel tool, calculation, image application, direct selection such as region-specific cropping, a lasso tool, a frame selection tool, or an eraser tool, and the like. A shape of the image obtained through cropping in the present disclosure may be the outline of the target object, a square, a circle, or another form of shape.

S14. Evaluate quality of the M small images.

The quality of the M small images may be evaluated by using a deep-learning-based quality evaluation algorithm or another quality evaluation method in other approaches. In this case, a quality evaluation result corresponding to the target object is obtained, and the quality evaluation result may be expressed by using a score. X small images whose quality evaluation results rank top may be selected from the M small images based on preset requirements and the quality evaluation results. Specifically, for example, a small image with a best quality evaluation result is selected for the target object. The optimal small image may be a snapshot obtained by the primary camera, or may be a snapshot obtained by a secondary camera. This is determined by a quality evaluation result or an algorithm. Usually, in a supplementary monitored region, at a same time and in a same place, quality of an image collected by a secondary camera is higher than quality of an image collected by the primary camera.

S15. Display at least a small image with a best quality evaluation result among the M small images.

Specifically, an optimal small image or a plurality of preferred small images may be obtained based on quality evaluation results. The optimal small image or the plurality of preferred small images is/are encoded by a video encoding unit and transmitted to a display terminal over a network. The display terminal decodes the optimal small image or the plurality of preferred small images, and displays the optimal small image on a display of the terminal. Optionally, if the display terminal has relatively large space, and the user needs to monitor an object emphatically in a specific period of time, X small images whose quality evaluation results rank top may be further selected and presented to the user. A display form may be as follows. The display includes a primary display region and a secondary display region. The primary display region is used to display a real-time video stream collected by the primary camera, and the secondary display region is used to display a small image of any target captured by the secondary camera. Further, original images corresponding to the X small images may be packaged and transmitted to a display end for subsequent display and verification.

In a specific implementation process, the preferred small images (top X small images) may be displayed in real time when the target object appears in a monitoring field of view. In this case, quality evaluation can be performed based on only currently collected and stored images that include the target object. Real-time update is performed once another small image that is of the target object and that has a better quality evaluation result is detected subsequently.

In a specific implementation process, the preferred small images (top X small images) may be displayed when the target object disappears in a monitoring field of view. In this case, quality evaluation can be performed based on only all collected and stored images that include the target object, and real-time update is not required.

S16. Adjust a photographing parameter of the primary camera or the secondary camera based on the image quality evaluation results.

It should be understood that step S16 is optional. Specifically, quality evaluation results of the M small images also include specific quality feedbacks for imaging quality of the primary camera and imaging quality of the plurality of secondary cameras. For example, the imaging quality includes brightness, a contrast, a blurring degree, a noise level, and the like of an image. Imaging parameters of the imaging cameras may be calculated based on an expected imaging effect, and the imaging parameters include exposure duration, a gain, a denoising parameter, and the like. In addition, the imaging parameters are fed back to the primary camera and the secondary cameras by using the multi-channel ISP processing unit 103. If imaging quality is poor with respect to current photographing parameters of the primary camera and the plurality of secondary cameras, adaptive adjustment and optimization may be performed based on the fed-back parameters.

Example 2

Figure 8:
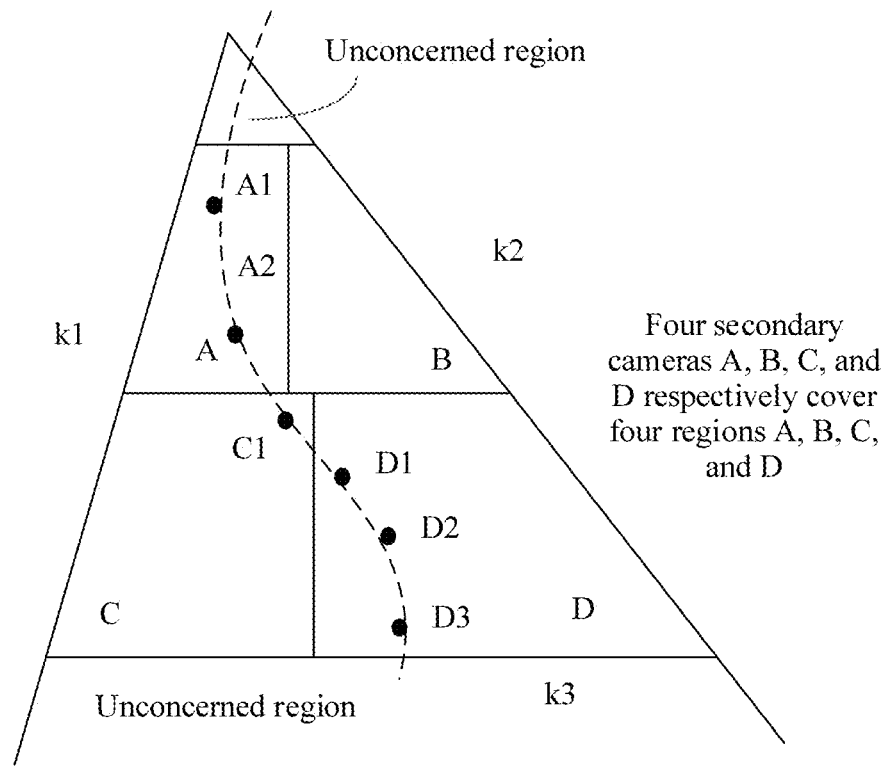
FIG. 8 is a schematic diagram of a monitoring example according to an embodiment of this application.

As shown in FIG. 8, focus regions of a monitoring system are regions (which may also be correspondingly referred to as regions A, B, C and D) monitored by four secondary cameras A, B, C, and D, and the four regions A, B, C and D are within a monitoring range (a region surrounded by k1, k2, and k3) of the primary camera. In this example, it may be understood that a region other than the regions A, B, C, and D is a region unconcerned during monitoring, and a dashed line represents an actual target track of a target object. In a period of time from a moment at which the target object enters the monitored region to a moment at which the target object leaves the monitored region, the target object passes through three regions A, C, and D. It is assumed that, in this process, the primary camera takes 50 frames of images of the target object, which are denoted as z1, z2, . . . , and z50, and the primary-camera detection thread or the secondary-camera detection thread of the multi-channel target detection and tracking unit 1041 detects the target object at A1, A2, C1, D1, D2, and D3, and sends a feedback to the multi-channel ISP processing unit 103 to store two images (denoted as a1 and a2) collected by the secondary camera A, an image (denoted as c2) collected by the secondary camera C, and three images (denoted as d1, d2, and d3) collected by the secondary camera D. It should be understood that, a1, a2, c1, d1, d2, and d3 have a larger area than images taken by the primary camera in corresponding regions. Further, there may be a larger amount of sensed light or more pixels.

The multi-channel preferred-snapshot selection unit 1042 determines, based on a position correspondence between the primary camera and the secondary camera in the region A, image collection timestamps, and positions of detected targets, that the a1 and a2 of the target detected in the region A and the z1 to z50 of the target detected by the primary camera are the same target. Similarly, the multi-channel preferred-snapshot selection unit 1042 determines, based on a position correspondence between the primary camera and the secondary camera in the region C, image collection timestamps, and positions of detected targets, that the c1 of the target detected in the region C and the z1 to z50 of the target detected by the primary camera are the same target, and determines, based on a position correspondence between the primary camera and the secondary camera in the region D, image collection timestamps, and positions of detected targets, that the d1, d2, and d3 of the target detected in the region D and the z1 to z50 of the target detected by the primary camera are the same target. Therefore, for the target object, a total of 50+2+1+3=56 images are obtained by the primary camera and the secondary cameras, and the multi-channel preferred-snapshot selection unit 1042 crops the 56 images based on a size or an outline of the target object, to obtain 56 small images that can significantly display the target object. In addition, quality of the 56 small images is evaluated according to a same preset evaluation standard, and top X images whose quality meets the standard are selected as preferred small images. A typical value of X is 1. If there is another requirement, X may be another positive integer, and is freely defined by the user based on a specific requirement. The value of X is not limited in the present disclosure. The X small images are transmitted to the display terminal after being encoded, and then are displayed to the user after being decoded by the display terminal. For example, if a quality evaluation result of d1 is the best, d1 is correspondingly displayed at the display end, to serve as a reference for the user to perform monitoring and analysis on the target object. In this case, the display end can display a real-time monitoring video of the primary camera in real time, and the user can see a moving track of the target object, but only the image d1 may be displayed in the other display region.

In addition, because another target may appear in the monitoring system, when another target is detected, a related image is also stored. To be specific, images actually detected by the multi-channel target detection and tracking unit 1041 are far more than the foregoing images, and images stored by the multi-channel ISP processing unit 103 are also far more than the foregoing images. In this example, only the target object is used as an example. It should be understood that, for any other object, a monitoring method and a monitoring procedure are the same as those in the example of the target object, and details are not described in the present disclosure.

The embodiments of the present disclosure provide a monitoring and photographing module and a monitoring method. "One primary camera+N secondary cameras" are used as a basic component for collecting images, a plurality of secondary cameras are arranged to overcome a disadvantage that an image photographed by the primary camera in a comparatively far position is unclear, and a design of a "long focus" and a "large aperture" of a secondary camera greatly compensate for a shortcoming in imaging quality of the primary camera. In this case, a clear image of a target object can be collected in most regions monitored by the primary camera. For the monitoring system, recognition accuracy of the monitoring system can be enhanced. In this way, a more powerful user use basis is provided for a commercial success of the monitoring system.

Figure 9:
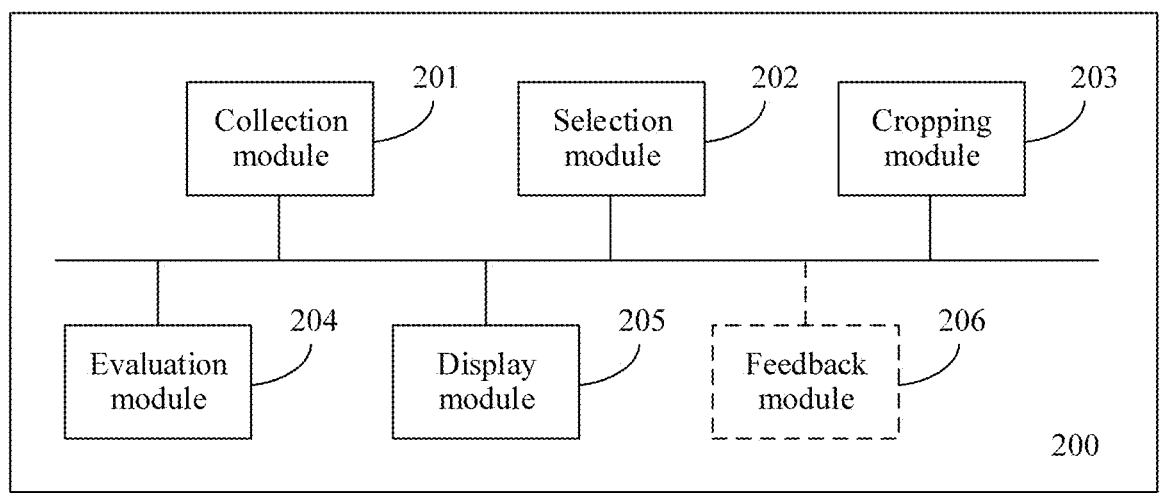
FIG. 9 is a schematic diagram of a monitoring apparatus according to an embodiment of this application.

Based on the monitoring methods provided in the foregoing embodiments, an embodiment of the present disclosure provides a monitoring apparatus. The apparatus is applied to a monitoring and photographing module, and the monitoring and photographing module includes one primary camera and N secondary cameras. Regions monitored by the N secondary cameras respectively cover N different regions in a region monitored by the primary camera, a focal length of any secondary camera is greater than a focal length of the primary camera, and N is an integer greater than 1. As shown in FIG. 9, the apparatus 200 may include a collection module 201, a selection module 202, a cropping module 203, an evaluation module 204, and a display module 205. Optionally, an aperture value of any secondary camera is less than an aperture value of the primary camera.

The collection module 201 is configured to collect images by using the primary camera and the N secondary cameras. A frame rate at which any secondary camera collects an image is less than a frame rate at which the primary camera collects an image. The module may be implemented by a processor by invoking a program instruction in a memory or an externally input program instruction, and collaborates with the cameras to obtain images, and performs some calculation processing on the images, to collect the images.

The selection module 202 is configured to select, from the images collected by the primary camera and the N secondary cameras, M images including a target object, where M is an integer greater than 1. The module may be implemented by the processor by invoking a program instruction in the memory or an externally input program instruction. The M images including the target object are selected by using an algorithm.

The cropping module 203 is configured to crop the M images based on the target object to obtain M small images including the target object. The module may be implemented by the processor by invoking a program instruction in the memory or an externally input program instruction, for example, an image cropping or matting algorithm or program.

The evaluation module 204 is configured to evaluate quality of the M small images. The module may be implemented by the processor by invoking a program instruction in the memory or an externally input program instruction.

The display module 205 is configured to display a small image with a best quality evaluation result among the M small images. The module may be implemented by the processor by invoking a program instruction in the memory or an externally input program instruction and working with a display.

In a specific implementation process, the collection module 201 is specifically configured to perform the method mentioned in S11 and an equivalent replacement method. The selection module 202 is specifically configured to perform the method mentioned in S12 and an equivalent replacement method. The cropping module 203 is specifically configured to perform the method mentioned in S13 and an equivalent replacement method. The evaluation module 204 is specifically configured to perform the method mentioned in S14 and an equivalent replacement method. The display module 205 is specifically configured to perform the method mentioned in S15 and an equivalent replacement method. Further, the apparatus 200 may further include a feedback module 206 that is specifically configured to perform the method mentioned in S16 and an equivalent replacement method. The foregoing specific method embodiments and explanations and descriptions in the embodiments are also applicable to method execution in the apparatus.

In a specific implementation process, the collection module 201 may have some functions of the primary camera 101, the secondary cameras 102, and the multi-channel ISP processing unit 103, and equivalent replacement functions, and specifically includes functions such as collecting images at respective preset frequencies, and performing raw domain processing on the images. The selection module 202 may have some functions of the multi-channel target detection and tracking unit 1041 and the multi-channel preferred-snapshot selection unit 1042, and equivalent replacement functions, and may specifically include functions such as target detection, sending a feedback to the multi-channel ISP processing unit 103 to store an image, target tracking, target ID marking, and screening for a same target. The cropping module 203 may have some functions of the multi-channel preferred-snapshot selection unit 1042, and equivalent replacement functions, and may specifically include an image cropping function. The evaluation module 204 may have some functions of the multi-channel preferred-snapshot selection unit 1042, and equivalent replacement functions, and may specifically include a function of evaluating, based on a preset quality evaluation method, quality of an image obtained after cropping, and a function of sorting displayed results. The display module 205 may have some functions of the display unit 107, and equivalent replacement functions, and may specifically include a function of decoding and presenting encoded image data. The embodiment related to FIG. 6 and explanations and descriptions in the embodiment are also applicable to corresponding functional modules in the apparatus.

The monitoring and photographing module to which the apparatus is applied may be the monitoring and photographing module obtainable in any one of the method embodiments. Details about a quantity of cameras and a hardware parameter are not described herein.

Figure 10:
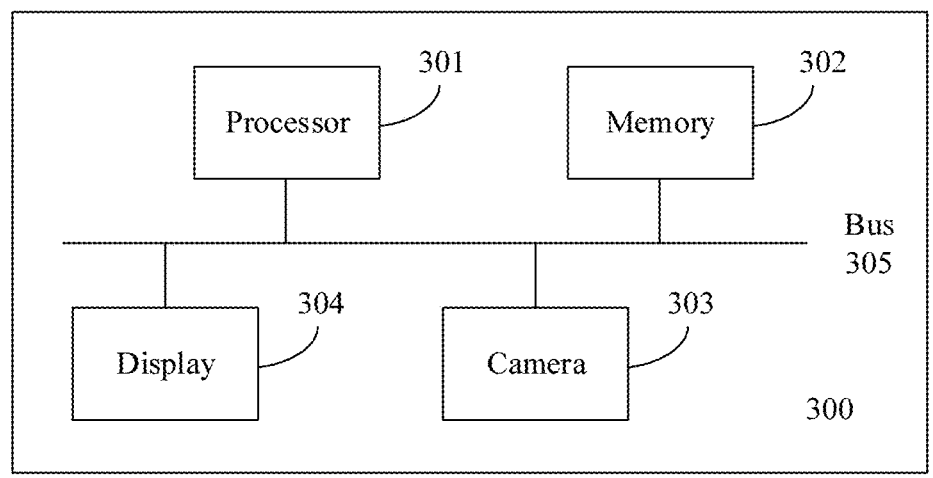
FIG. 10 is a schematic diagram of a monitoring device according to an embodiment of this application.

An embodiment of this application further provides a monitoring device 300. As shown in FIG. 10, the device includes a processor 301, a memory 302, a plurality of cameras 303, a display 304, and a bus 305. The processor 301, the memory 302, the plurality of cameras 303, and the display 304 are connected by using the bus 305. The memory 302 stores a program instruction and data. The camera 303 is configured to collect an image, the display 304 is configured to display a video or an image, and the processor 301 is configured to invoke the data and the program instruction in the memory, to collaborate with the plurality of cameras 303 and the display 304 to perform any one of the methods and the possible design methods provided in the foregoing embodiments. The plurality of cameras 303 may be configured as any monitoring and photographing module that may be obtained in the method embodiment. Details about a quantity of cameras and a hardware parameter are not described herein.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a compact disc-read-only memory (CD-ROM), an optical memory, and the like) including computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A monitoring and photographing system comprising:
a primary camera configured to collect a first plurality of images of a region at a first frame rate, wherein the primary camera has a primary focal length; and
a plurality of secondary cameras each configured to:
collect a second plurality of images at a second frame rate, wherein the second frame rate is less than the first frame rate; and
monitor a subregion within the region,
wherein the secondary cameras have a plurality of secondary focal lengths, and
wherein the secondary focal lengths are greater than the primary focal length.

2. The monitoring and photographing system of claim 1, wherein a field of view of the primary camera is greater than 60 degrees (°), wherein the primary focal length is between 4 millimeters (mm) and 8 mm, and wherein an aperture value of the primary camera is between 1.4 and 2.0.

3. The monitoring and photographing system of claim 1, wherein a focal length of at least one of the secondary cameras is between 8 millimeters (mm) and 15 mm.

4. The monitoring and photographing system of claim 1, wherein a focal length of at least one of the secondary cameras is between 15 millimeters (mm) and 25 mm.

5. The monitoring and photographing system of claim 1, wherein a first aperture value of at least one of the secondary cameras is between 0.8 and 1.6, and wherein the first aperture value is less than a second aperture value of the primary camera.

6. The monitoring and photographing system of claim 1, wherein the secondary cameras comprise four secondary cameras, and wherein a plurality of focal lengths of the four secondary cameras is between 18 millimeters (mm) and 21 mm.

7. The monitoring and photographing system of claim 1, wherein the secondary cameras comprise seven secondary cameras, wherein a plurality of focal lengths of three of the seven secondary cameras is between 12 millimeters (mm) and 18 mm, and wherein a plurality of focal lengths of four of the seven secondary cameras is between 21 mm and 25 mm.

8. A monitoring method, implemented by a monitoring and photographing system, wherein the monitoring method comprises:
collecting a first plurality of images of a region at a first frame rate using a primary camera of the monitoring and photographing system;
collecting a second plurality of images of subregions of the region at a second frame rate using a plurality of secondary cameras of the monitoring and photographing system, wherein the second frame rate is less than the first frame rate;
determining a target object that meets a quality condition;
selecting, from the first images and the second images, a third plurality of images comprising the target object; and
obtaining a target snapshot from the third images,
wherein the target snapshot comprises the target object.

9. The monitoring method of claim 8, wherein the second frame rate is based on different types of targets or different monitoring scenarios.

10. The monitoring method of claim 8, further comprising:
obtaining a quality evaluation result of the target snapshot; and
adjusting, based on the quality evaluation result, a first photographing parameter of the primary camera or a second photographing parameter of at least one of the secondary cameras.

11. The monitoring method of claim 8, further comprising:

cropping the third images based on the target object to obtain a fourth plurality of images comprising the target object;

evaluating a quality of the fourth images; and selecting, as the target snapshot, at least one of the fourth images in response to the quality of the at least one of the fourth images meeting a condition.

12. The monitoring method of claim 8, wherein a field of view of the primary camera is greater than 60 degrees (°), wherein a focal length of the primary camera is between 4 millimeters (mm) and 8 mm, and wherein an aperture value of the primary camera is between 1.4 and 2.0.

13. The monitoring method of claim 8, wherein a focal length of at least one of the secondary cameras is between 8 millimeters (mm) and 15 mm or between 15 mm and 25 mm.

14. The monitoring method of claim 8, wherein a first aperture value of at least one of the secondary cameras is between 0.8 and 1.6, and wherein the first aperture value is less than a second aperture value of the primary camera.

15. The monitoring method of claim 8, further comprising:

detecting, using a primary-camera detection thread, that a fourth plurality of images in the first images comprises the target object;

storing the fourth images to a buffer;

detecting, using the primary-camera detection thread or a secondary-camera detection thread, that a fifth plurality of images in the second images comprises the target object;

storing the fifth images to the buffer; and recognizing the fourth images and the fifth images as the third images based on image photographing timestamps of the primary camera and the secondary cameras, target positions, and an image mapping relationship between the primary camera and each of the secondary cameras, wherein a first quantity of the third images is equal to a second quantity of the fourth images plus a third quantity of the fifth images.

16. A monitoring apparatus, applied to a monitoring and photographing system, wherein the monitoring apparatus comprises:

a processor; and a memory coupled to the processor and configured to store instructions that, when executed by the processor, cause the monitoring apparatus to be configured to:

collect a first plurality of images of a region at a first frame rate using a primary camera of the monitoring and photographing system;

collect second images of subregions of the region at a second frame rate using a plurality of secondary cameras of the monitoring and photographing system, wherein the second frame rate is less than the first frame rate;

determine a target object that meets a quality condition;

select, from the first images and the second images, a third plurality of images comprising the target object; and obtain a target snapshot from the third images, wherein the target snapshot comprises the target object.

17. The monitoring apparatus of claim 16, wherein the second frame rate is based on different types of targets or different monitoring scenarios.

18. The monitoring apparatus of claim 16, wherein the instructions further cause the monitoring apparatus to be configured to:

obtain a quality evaluation result of the target snapshot; and adjust, based on the quality evaluation result, a first photographing parameter of the primary camera or a second photographing parameter of at least one of the secondary cameras.

19. The monitoring apparatus of claim 16, wherein the instructions further cause the monitoring apparatus to be configured to:

crop the third images based on the target object to obtain a fourth plurality of images comprising the target object;

evaluate a quality of the fourth images; and select, as the target snapshot, at least one of the fourth images in response to the quality of the at least one of the fourth images meeting a condition.

20. The monitoring apparatus of claim 16, wherein the instructions further cause the monitoring apparatus to be configured to:

detect, using a primary-camera detection thread, that a fourth plurality of images in the first images comprises the target object;

store the fourth images to a buffer;

detect, using the primary-camera detection thread or a secondary-camera detection thread, that a fifth plurality of images in the second images comprises the target object;

store the fifth images to the buffer; and recognize the fourth images and the fifth images as the third images based on image photographing timestamps of the primary camera and the secondary cameras, target positions, and an image mapping relationship between the primary camera and each of the secondary cameras, wherein a first quantity of the third images is equal to a second quantity of the fourth images plus a third quantity of the fifth images.

* * * * *